May 29, 1956

E. BACH ET AL 2,747,869

SHEET HANDLING APPARATUS

Filed Nov. 14, 1951

INVENTORS.
Emmon Bach
BY Edwin W. Goodwin
Richard H. Raunecker

Dale A. Bauer
ATTORNEY

May 29, 1956

E. BACH ET AL 2,747,869

SHEET HANDLING APPARATUS

Filed Nov. 14, 1951

INVENTORS.
Emmon Bach
Edwin W. Goodwin
Richard H. Raunecker

BY Dale A. Bauer
ATTORNEY

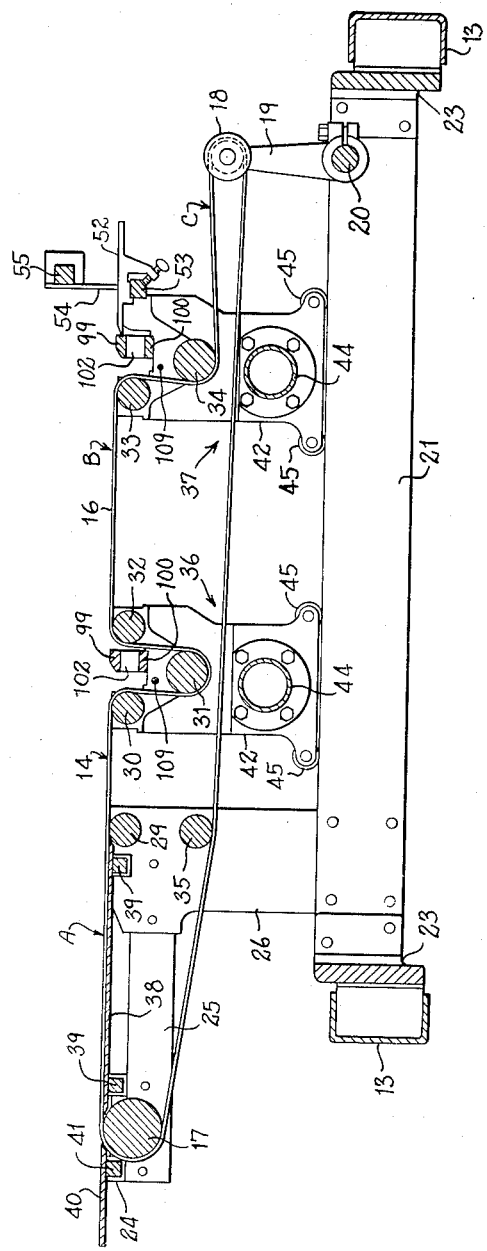

May 29, 1956
E. BACH ET AL
2,747,869
SHEET HANDLING APPARATUS
Filed Nov. 14, 1951
4 Sheets-Sheet 4
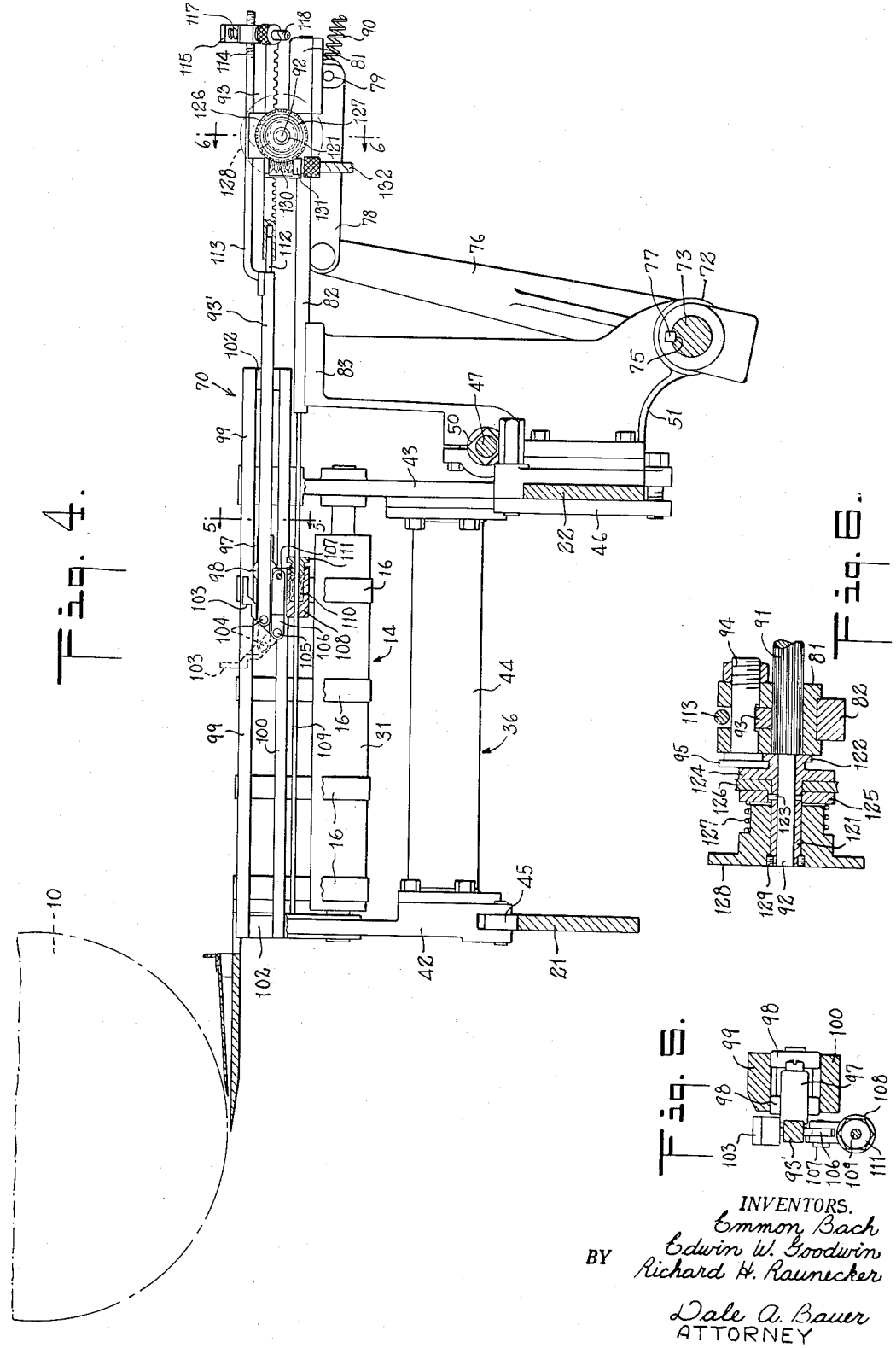
INVENTORS.
Emmon Bach
Edwin W. Goodwin
Richard H. Raunecker
BY Dale A. Bauer
ATTORNEY › # United States Patent Office 2,747,869
Patented May 29, 1956

2,747,869

SHEET HANDLING APPARATUS

Emmon Bach, Scarborough, Edwin W. Goodwin, New Rochelle, and Richard H. Raunecker, Jamaica, N. Y., assignors to Dexter Folder Company, Pearl River, N. Y., a corporation of New York Application November 14, 1951, Serial No. 256,202

13 Claims. (Cl. 271—54)

This invention relates to sheet handling apparatus and more particularly to devices for feeding sheets successively in angularly related directions.

One of the objects of the present invention is to provide a novel arrangement and construction of sheet conveying means and sheet transferring means whereby successive sheets may be effectively advanced in timed relation first in one direction and then in another direction at right angles to said first-named direction.

Another object of the invention is to provide novel sheet transferring mechanism which is simple in construction and effective in operation for moving sheets on a conveyor transversely thereof to a position for removal laterally from said conveyor.

Another object is to provide novel sheet transferring mechanism of the above character comprising reciprocal sheet engaging pusher fingers which after operation thereof on a preceding sheet will be moved out of the plane of the conveyor so as not to interfere with the movement of a succeeding sheet into transferring position.

Still another object is to provide novel sheet transferring mechanism of the above character comprising reciprocal sheet engaging pusher fingers which may be quickly and easily adjusted collectively and individually while the same are in operation to insure accurate engagement thereof with the sheets.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a top plan view of a sheet conveyor and transfer mechanism constructed and operated in accordance with the present invention, certain of the parts having portions thereof broken away for purposes of clearer illustration;

Fig. 3 is a vertical longitudinal sectional view on the line 3—3 of Fig. 1;

Fig. 4 is a transverse vertical sectional view substantially on the line 4—4 of Fig. 1, on an enlarged scale;

Fig. 5 is a fragmentary vertical longitudinal sectional view on the line 5—5 of Fig. 4, on an enlarged scale; and Fig. 6 is a fragmentary vertical longitudinal sectional view on the line 6—6 of Fig. 4, on an enlarged scale.

Figure 1:
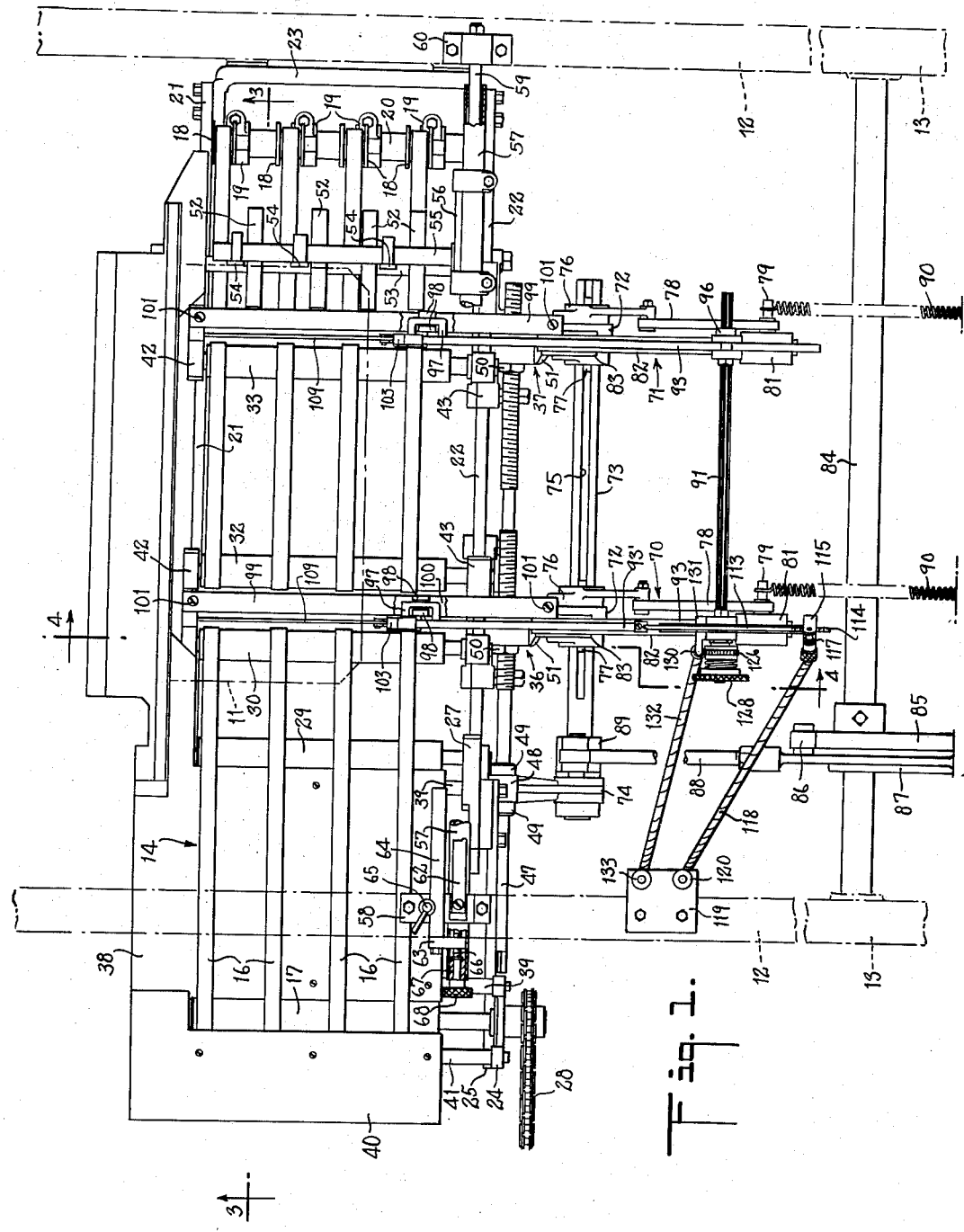

Referring to the drawings, there is shown, by way of example, one form of sheet conveyor and transfer mechanism constructed and operated in accordance with the present invention, which is particularly adapted for presenting sheets of cover material successively in timed relation from a supply thereof to a machine employed in the processing or making of hard casings for books. It will be understood, however, that the novel sheet conveyor and transfer mechanism may also be used advantageously and effectively in feeding sheets of paper, cardboard, metal or other material to any type of printing press, folding machines, coating machines, slitters, punch presses, and various other instrumentalities acting on such sheets. The novel sheet conveyor and transfer mechanism may also be embodied in any sheet handling machine wherein it is desired to advance successive sheets in angularly related directions for performance of various operations thereon.

With reference to the drawings, particularly to Fig. 4 thereof, 10 diagrammatically indicates the in-feed cylinder or drum of a case-making machine, which is employed to receive the sheets of cover material, one of which is shown in broken lines in Fig. 1 and indicated by reference character 11, one after another and carry said sheets in like manner past an adhesive applicator and then into said machine wherein the marginal portions of each cover sheet are folded over cardboard stiffening sheets adhesively combined with said cover sheet to form a hard book-case, as well understood in the art. The in-feed cylinder 10 may be of the suction or mechanical gripper type and is rotatably mounted on the framework of the case-making machine, which framework includes two transversely spaced upper side-frame beams 12 and two transversely spaced lower side-frame beams 13. The upper beams 12 are indicated in broken lines in Fig. 1 for the purpose of more clearly illustrating the sheet conveyor and transfer mechanism of the present invention. Inasmuch as the case-making machine, including the in-feed cylinder 10, does not form a part of the present invention, such machine is not shown nor described in further detail.

In machines other than case-making machines with which the sheet conveyor and transfer mechanism of the present invention may be associated, the sheet receiving device represented by the in-feed cylinder 10 in the illustrated embodiment, may be the impression cylinder or transfer device of a printing press, or may be in the form of opposed feed and pressure rollers and/or an endless tape or other type of conveyor in other machines.

Figure 2:
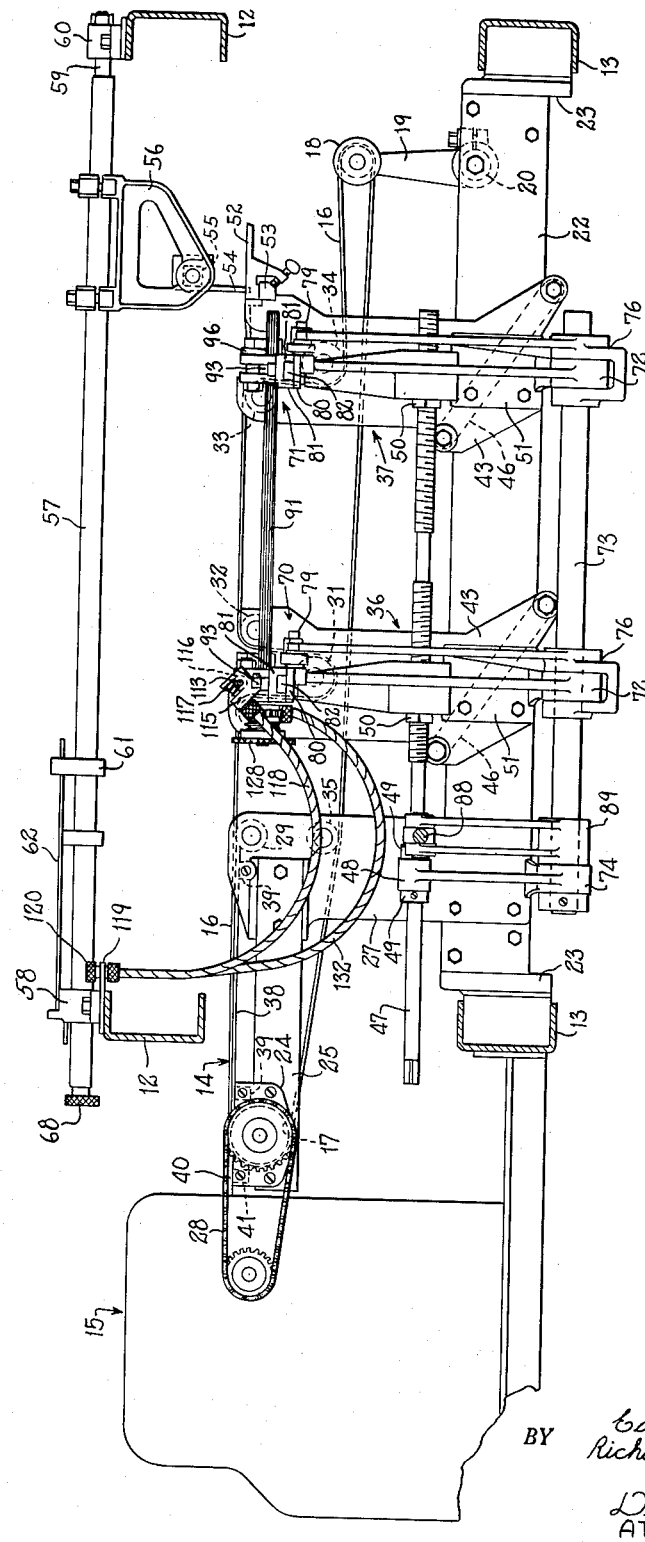
Fig. 2 is a side elevational view of said sheet conveyor and transfer mechanism, with parts omitted for purposes of clearer illustration.

As herein shown, the sheet conveyor and transfer mechanism of the present invention for feeding the sheets 11 of cover material to the case-making machine in the illustrated embodiment, or for feeding other sheets 11 of other materials to other machines, comprise the following instrumentalities preferably constructed, mounted and operated as follows. Disposed adjacent the in-feed cylinder 10 or other sheet receiving device and extending parallel with the axis of rotation of said cylinder or other device is a conveyor, indicated generally at 14, onto which the sheets 11 are delivered successively and in timed relation from a supply of such sheets by a sheet feeder, indicated generally at 15 (Fig. 2), which may be of any suitable well known type. Inasmuch as the sheet feeder 15 is known and per se is not part of the present invention, such feeder is not shown nor described in detail. For a purpose to appear hereinafter, the successive sheets 11 are delivered to the conveyor 14 such that the longitudinal side edge of each sheet adjacent the in-feed cylinder 10 is located a predetermined distance away from the axis of rotation of said cylinder.

The conveyor 14 comprises a plurality of transversely spaced parallel endless tapes or belts 16, the rear portions of which pass around a driven roller 17. The front portions of the tapes 16 pass around flanged rollers 18 which are located below the plane of the conveyor 14 and are journalled on arms 19 that are adjustably clamped to a stay shaft 20 so that slack may be taken up in the tapes 16 as desired. The stay shaft 20 extends transversely of the conveyor 14 and is bolted or otherwise suitably secured at opposite ends thereof to two transversely spaced longitudinally extending bars 21 and 22 disposed below and at opposite sides of the conveyor 14. The bars 21, 22 are bolted or otherwise suitably secured at opposite ends thereof to two transversely extending longitudinally spaced brackets 23 which, in turn, are bolted or otherwise suitably secured to the lower sideframe beams 13.

The driven tape roller 17 extends transversely of the conveyor 14 and is journalled at opposite ends thereof in suitable bearings provided in brackets 24 which are bolted or otherwise suitably secured to two longitudinally extending side bars 25. These bars 25 are bolted or otherwise suitably secured at their forward ends to two brackets 26 and 27 which, in turn, are bolted or otherwise suitably secured to the bars 21 and 22, respectively, and project upwardly therefrom. The tapes 16 are continuously driven by the roller 17 at a desired surface speed to rapidly advance the successive sheets 11 in spaced relation to transferring position on the conveyor 14, and for this purpose, said roller is driven through a chain-and-sprocket drive 28 by the sheet feeder 15 which may be driven from the case-making machine or other machine to which the sheets are fed, or by a separate motor.

As shown, particularly in Fig. 3 of the drawings, the tapes 16 are so arranged that the upper sheet-supporting-and-conveying reaches thereof pass over idler rollers 29 and 30, then under an idler roller 31, then over idler rollers 32 and 33, and then under an idler roller 34 to the tape tightening rollers 18. The idler rollers 29, 30, 32, and 33 are located in the same horizontal plane, and the idler rollers 31 and 34 are located in a plane below the plane of the rollers 29, 30, 32 and 33. From the tape tightening roller 18, the lower reaches of the tapes 16 pass under an idler roller 35 which serves to hold said reaches away from the upper reaches and the idler rollers 31 and 34. The idler rollers 29 and 35 extend transversely of the conveyor 14 and are journalled at opposite ends thereof in suitable bearings in the fixed brackets 26 and 27. The idler rollers 30, 32 extend transversely of the conveyor 14 in spaced parallel relation, and the idler roller 31 extends transversely of said conveyor and is located between and below the rollers 30, 32 so as to provide an unobstructed space between the latter rollers for a purpose to appear hereinafter. The rollers 30, 31 and 32 are journalled at opposite ends thereof in suitable bearings on a carriage, indicated generally at 36, to be presently described in detail. The idler rollers 33 and 34 extend transversely of the conveyor 14 with the roller 34 disposed below the roller 33 so as to provide an unobstructed space forwardly of the roller 33 for a purpose to appear hereinafter, and said rollers are journalled at opposite ends thereof in suitable bearings provided on a carriage, indicated generally at 37, to be presently described in detail.

It will be noted that because of the described arrangement of the tape rollers 30, 31, 32, 33 and 34, the upper reaches of the tapes 16 are in effect divided into two longitudinally spaced active sections, as indicated at A and B (Fig. 3), and a third inactive section, as indicated at C, disposed below the active sections A and B, whereby novel sheet transfer mechanism, to be hereinafter described in detail, may be arranged and operated between the active tape sections A and B and forwardly of the tape section B for moving the successive sheets 11 transversely of the conveyor 14 and transferring said sheets to the in-feed cylinder 10 or other sheet receiving device. It will also be noted that by virtue of the described mounting of the tape rollers, 30, 31 and 32, and 33 and 34 on the carriages 36 and 37 respectively, the tape sections A, B and C, the relative spacing of the tape sections A and B, and the free space forwardly of the tape section B are maintained when the carriages 36 and 37 are adjusted toward and away from each other by means to be presently described to accommodate different sizes of sheets 11 that may be handled in the machine. When handling small size sheets 11, the carriages 36 and 37 are adjusted toward each other, whereupon the length of the tape section B is decreased with a corresponding increase in the lengths of the tape sections A and C. When handling large size sheets 11, the carriages 36 and 37 are adjusted away from each other, whereupon the length of the tape section B is increased with a corresponding decrease in the lengths of the tape sections A and C. These adjustments of the carriages 36 and 37 are made so that when each sheet 11 regardless of its size is disposed in transferring position on the conveyor 14, the leading or front portion of said sheet will project beyond the forward end of the tape section B, and the trailing or rear portion of said sheet will overlie the space between the tape sections A and B to enable operation thereon of the sheet transfer mechanism above referred to. In the illustrated embodiment, each sheet 11 when in transferring position on the conveyor 14, is preferably located centrally with respect to the in-feed cylinder 10 or other sheet receiving device.

The section A of the upper reaches of the tapes 16 passes over and is supported by a plate 38 which is disposed between the rollers 17 and 29 and is suitably secured to two transversely extending bars 39. One of the bars 39 is bolted or otherwise suitably secured at opposite ends thereof to the brackets 24, and the other of the bars 39 is bolted or otherwise suitably secured at opposite ends thereof to the brackets 26 and 27. The successive sheets 11 are guided from the feeder 15 or other device onto the conveyor 14 by a transversely extending plate 40 which is suitably secured to a transverse bar 41 and projects rearwardly into the feeder. The bar 41 is bolted or otherwise suitably secured at opposite ends thereof to the brackets 24. It will be understood that individual slats or fingers may be used in lieu of the plates 38 and 40, said slats or fingers being adjustably secured to the cross bars 39 and 41. It will also be understood that the conveyor 14 is provided with the usual spring-pressed rider wheels (not shown) which cooperate with the tapes 16 to insure movement of the sheets 11 along said conveyor to transferring position, and with the usual top rods or bars (not shown) which serve to prevent upward displacement of the sheets 11 from the conveyor during movement therealong, as well understood in the art.

The carriages 36 and 37 are identical in construction and operation and a description of one of said carriages will therefore be sufficient for both of the same. As herein shown, each carriage 36, 37 comprises two vertically disposed transversely spaced and aligned brackets 42 and 43 which are connected together by a tie-tube 44, or the like, bolted or otherwise suitably secured to said brackets. The bracket 42 of each carriage 36, 37 is slidably mounted on and supported by the bar 21 and has journalled thereon at the lower end thereof two rollers 45 engaged with said bar to enable free movement of said bracket along the bar. The bracket 43 of each carriage 36, 37 is engaged over and slidably supported by the bar 22 and is held against outward lateral displacement from said bar by a retaining member 46 which extends diagonally across the bar 22 and is bolted or otherwise suitably secured to said bracket. The brackets 42, 43 of carriage 36 are provided with suitable bearings for receiving the journals of tape rollers 30, 31, and 32, and the brackets 42, 43 of carriage 37 are provided with suitable bearings for receiving the journals of tape rollers 33 and 34.

Adjustment of the carriages 36, 37 toward or away from each other along the bars 21 and 22 is accomplished by a screw shaft 47 which is rotatably mounted in a bearing boss 48 secured to or formed integrally with the bracket 27. Axial movement of the shaft 47 is prevented by two collars 49 disposed at opposite sides of the boss 48 and secured to said shaft. The shaft 47 is provided with right- and left-hand threaded portions which are threaded through internally threaded bushings 50 releasably clamped in brackets 51, one of which is bolted or otherwise suitably secured to the bracket 43 of the carriage 36, and another of which is bolted or otherwise suitably secured to the bracket 43 of the carriage 37. The bushings 50 permit individual adjustment of the carriages 36 and 37 relatively to each other along the bars 21 and 22. The shaft 47 is suitably formed at one end thereof to receive a crank to facilitate turning said shaft whereby the carriages 36, 37 will be simultaneously moved toward or away from each other equal amounts.

The sheets 11 are advanced successively by the tapes 16 over longitudinally extending laterally spaced sheet supporting fingers 52 into position for action thereon by timed sheet transferring mechanism hereinafter described. The sheet supporting fingers 52 are clamped or otherwise suitably secured in position on a bar 53 which extends transversely of the conveyor 14 and is bolted or otherwise suitably secured at opposite ends thereof to the brackets 42, 43 of the carriage 37 for movement with said carriage to various positions of adjustment thereof. The fingers 52 are of such length that a space substantially corresponding with the space between the tape rollers 30, 32 exists between the tape roller 33 and the rear ends of said fingers. Each sheet 11 is carried forwardly by the tapes 16 over the fingers 52 until its leading edge engages sheet stops 54 which arrest the movement of the sheet and hold it in transferring position for action thereon of the timed sheet transferring mechanism above referred to. The sheet stops 54 extend in alignment transversely of the conveyor 14 and project downwardly between the fingers 52. The stops 54 are adjustably mounted on a bar 55 extending transversely of the conveyor 14 and secured at one end thereof to a bracket 56. This bracket 56 is clamped to a tubular shaft 57 which extends longitudinally of the conveyor 14 above and at one side thereof. The shaft 57 is slidably mounted adjacent the rear end thereof in a bracket 58, and is slidably supported at the forward end thereof on a short shaft or pin 59 which is telescoped into said shaft and is suitably secured in a bracket 60. The brackets 58 and 60 are bolted or otherwise suitably secured to the upper side-frame beams 12. Rotation of the shaft 57 relative to the bracket 58 and pin 59 is prevented by a collar 61 which is secured to said shaft and straddles a strip or tongue 62 that is suitably secured to said bracket and projects forwardly therefrom.

Projecting into the tubular shaft 57 through a suitable slot formed therein at the rear end thereof is a block 63 (Fig. 1) which is bolted or otherwise suitably secured to one end of a short bar 64 that extends longitudinally of the conveyor 14 and is slidably mounted in a suitable groove formed in the bracket 58. Threaded into the bracket 58 is a flanged clamp screw 65 which is adapted to releasably clamp the bar 64 to said bracket against relative movement. Threaded through a suitable threaded opening formed in the block 63 is a screw 66 which projects from said block beyond the rear end of the tubular shaft 57 through a suitable clearance opening formed in a bushing 67 that is removably secured in any suitable manner within said shaft. Axial movement of the screw 66 relative to the shaft 57 is prevented in one direction by a flange on said screw engaging against the inner end of the bushing 67, and in the opposite direction by an operating knob 68 suitably secured to said screw and engaging against the outer end of said bushing.

It will thus appear that when it is desired to effect a considerable movement or coarse adjustment of the sheet stops 54, this can be quickly and conveniently accomplished by first loosening the clamp screw 65 to release the bar 64, then grasping the knob 68 or rear end of the shaft 57 and sliding said shaft and therewith the sheet stops 54 longitudinally of the conveyor 14 in either direction until said sheet stops are in position to approximate the desired sheet transferring position. After the sheet stops 54 have been moved to an approximate position as described, the clamp screw 65 is again tightened to immovably clamp the bar 64, whereupon the sheet stops are given a fine, final adjustment by simply rotating the knob 68 in the proper direction, resulting in minute axial movements of the shaft 57 and location thereby of said sheet stops in accurate sheet stopping and transferring position. This final adjustment of the sheet stops 54 is preferably made after the machine has been started and one or more test sheets have been run through the machine. The aforesaid adjustments of the sheet stops 54 are made in accordance with the size of the sheet 11 and to insure that regardless of its size it will be stopped on the conveyor 14 in the desired transferring position.

Assuming that the carriages 36, 37 and the sheet stops 54 have been properly adjusted for a given size sheet 11, the leading edge of said sheet fed forwardly by the tapes 16 engages said stops and the sheet is thereby arrested and held in proper position on the conveyor 14 with the leading or front portion thereof resting on the fingers 52 and projecting beyond the forward end of the tape section B, and the trailing or rear portion thereof overlying the space between the tape sections A and B. At this time, the stopped sheet 11 is moved transversely of the conveyor 14 and presented to the in-feed cylinder 10 by novel sheet transferring mechanism comprising at least two identical sheet transfer devices, indicated generally at 70 and 71. The sheet transfer device 70 is carried by the carriage 36 and is arranged to operate in the space between the tape sections A and B, and the sheet transfer device 71 is carried by the carriage 37 and is arranged to operate in the space between the tape section B and the sheet supporting fingers 52.

As herein shown, the sheet transfer devices 70, 71 are preferably operated and each is comprised by the following instrumentalities. Disposed in spaced parallel relation with the bar 22 and journalled in suitable bearing bosses 72 secured to or formed integrally with the brackets 51 carried by the carriages 36 and 37 is a rock shaft 73 which is further journalled at one end thereof in a suitable bearing boss 74 secured to or formed integrally with the fixed bracket 27. Shaft 73 is provided with an axial keyway 75 of substantial length. Engaged over the shaft 73 and embracing the bearing bosses 72 are two levers 76 which project upwardly from said shaft and are connected thereto for rocking movement therewith by keys 77 fixed in said levers and slidably engaged in the keyway 75. Levers 76 may thus be adjusted along the shaft 73 with the carriages 36 and 37 without disturbing their operating positions and the driving connections with said shaft.

Pivotally connected to the upper ends of the levers 76 are corresponding ends of links 78, the opposite ends of which are pivotally connected to pins 79 secured in any suitable manner in bottom plates 80 which are bolted or otherwise suitably secured to slide brackets 81. These brackets 81 are engaged over and fitted for reciprocation on horizontal bars 82, the bottom plates 80 serving to hold said brackets against upward displacement from said bars. One of the bars 82 is located in transverse alignment with the space between the tape sections A and B and is bolted or otherwise suitably secured to a shelf 83 formed on the bracket 51 which is carried by and adjustable with the carriage 36. The other of the bars 82 is located in transverse alignment with the space between the tape section B and the sheet supporting fingers 52 and is bolted or otherwise suitably secured to a shelf 83 formed on the bracket 51 that is carried by and adjustable with the carriage 37.

Journalled in suitable bearings on the lower side-frame beams 13 and extending transversely of said beams is a cam shaft 84 (Fig. 1) that is driven continuously in any suitable manner and makes one complete revolution during each cycle of operation of the machine. Fixed on the shaft 84 for rotation therewith is a cam 85 which engages a cam roller 86 that is journalled on an opened cam strap 87 which straddles said shaft. Adjustably carried by the cam strap 87 is a connecting rod 88 which is pivotally connected to a lever 89 that is fixed on the rock shaft 73 and projects upwardly therefrom. Connected to the pivot pins 79 in the bottom plates 80 are corresponding ends of extension coil springs 90, the opposite ends of which are connected in a suitable manner at suitable points on the framework of the machine. It will thus appear that the rock shaft 73, through the described operating connections therefor with the cam 85 is operated by said cam in a counter-clockwise direction, as viewed in Fig. 4, to move the slide brackets 81 along the bars 82 in a direction towards the conveyor 14 through the described operating connections for said brackets with said shaft, and that the slide brackets 81 and shaft 73 are operated in the opposite direction away from the conveyor 14 by the springs 90 under the control of the cam 85, said springs serving to hold the roller 86 in engagement with said cam.

Extending transversely of both sheet transfer devices 70, 71 and rotatably carried by the slide brackets 81 of said devices is a gear-shaft 91 which is formed, for a purpose to be hereinafter described, with a plain end 92 (Fig. 6) of reduced diameter projecting outwardly beyond the slide bracket 81 of the sheet transfer device 70 carried by the carriage 36. This gear-shaft 91 meshes with the teeth of rack bars 93 which are slidably carried by the slide brackets 81 above and in spaced parallel relation with the supporting bars 82. The rack bar 93 of the sheet transfer device 70 extends into the space between the tape sections A and B, and is held in meshing engagement with the gear-shaft 91 by a headed stud 94 (Fig. 6) which is suitably secured in the slide bracket 81 of said device and extends over said rack bar without binding the latter in said bracket and against said gear-shaft. The stud 94 is formed with an external flange 95 for a purpose to be hereinafter described. The rack bar 93 of the sheet transfer device 71 extends into the space between the tape section B and the sheet supporting fingers 52, and is held in meshing engagement with the gear-shaft 91 by a headed stud 96, or the like, which is suitably secured in the slide bracket 81 of said device and extends over said rack bar without binding the latter in said bracket and against said gear-shaft. It will thus appear that when the slide brackets 81 of the sheet transfer devices 70, 71 are reciprocated along their respective supporting bars 82 by the described means for this purpose, the rack bars 93 will be reciprocated transversely of the conveyor 14 through movement of the gear-shaft 91 with said slide brackets and meshing engagement thereof with said rack bars.

The rack bars 93 are supported and guided for straight-line horizontal reciprocating movement below the plane of the sections A and B of the upper reaches of the tapes 16. For this purpose, each rack bar 93 has bolted or otherwise suitably secured thereto at one side and adjacent the inner end thereof a bracket 97 (Figs. 1, 4 and 5) having journalled thereon two axially spaced anti-friction-bearing rollers 98 which are located between and adapted to have rolling contact with upper and lower horizontal guide bars 99 and 100, respectively, extending transversely of the conveyor 14, there being one set of said guide bars for the sheet transfer device 70 and disposed in the space between the tape sections A and B, and another set of said guide bars for the sheet transfer device 71 and disposed in the space between the tape section B and the sheet supporting fingers 52. The lower guide bars 100 are suitably secured to the end brackets 42, 43 of the carriages 36 and 37, respectively, and the upper guide bars 99 are, in turn, secured to the bars 100 in spaced parallel relation by machine screws 101, or the like, which pass through the bars 99 and through suitable spacer blocks 102 and are threaded into the bars 100. The upper surfaces of the bars 99 are substantially in the same plane as that of the sections A and B of the upper reaches of the tapes 16, and said bars are bevelled along their rear top edges in order to insure that the sheets 11 will not be obstructed by the bars as they move thereover on the conveyor 14.

The inner end of each rack bar 93 is vertically slotted to receive a flat portion of a sheet engaging pusher finger 103 (Figs. 4 and 5) which is pivotally connected intermediate its ends, as indicated at 104, to said rack bar and is preferably shaped substantially as shown in Figs. 4 and 5 to provide at the upper end thereof a relatively wide sheet engaging portion which is turned at right angles to said flat portion and is disposed at an angle of 45° with respect to said flat portion. The sheet engaging pusher finger 103 on each rack bar 93 is further pivotally connected at its lower end, as indicated at 105, to one end of a link 106, the opposite end of which is pivotally connected as at 107 to an elongated collar or hub 108 which is slidably engaged over a rod 109. The rods 109 receiving the collars or hubs 108 of both sheet transfer devices 70, 71 extend transversely of the conveyor 14 and are suitably secured at corresponding ends thereof to the supporting bars 82 of said devices and have their opposite ends suitably secured in the end brackets 42 of the respective carriages 36 and 37.

Each of the collars or hubs 108 is suitably bored for a portion of the length thereof to receive therein a quantity of packing material 110 such as, for example, graphite rings or graphite impregnated cord, and is internally threaded to receive a packing nut 111 for compressing said packing material sufficiently to cause the same to frictionally grip the rod 109. Thus the collars or hubs 108 can slide on the rods 109 if pressure is applied thereto, but will normally be held against such sliding by the compressed packing material 110. Any other means for causing the collars or hubs 108 to frictionally grip the rods 109 may be employed in lieu of the packing material 110 and nut 111, such as, for example, spring-pressed friction pins formed of fibre or the like material suitably carried by said collars or hubs.

In the operation of the sheet transferring mechanism thus far described, assuming that the operation of the sheet transfer devices 70, 71 has been properly timed with the feeding of the sheets 11 onto the conveyor 14, and that a sheet 11 is being advanced by the tapes 16 along said conveyor towards the sheet stops 54. At this time the slide brackets 81, the rack bars 93, the sheet engaging pusher fingers 103, and the collars 108 are in their retracted positions, shown in full lines in Figs. 1 and 4, wherein it will be noted that said pusher fingers are not only disposed clear of the path of movement of the advancing sheet 11, but are also turned back so that the upper sheet engaging portions thereof are horizontally disposed parallel with said rack bars and below the plane of the sheet supporting and conveying reaches of the tapes 16. Assuming now that the sheet 11 has been carried forward by the tapes 16 to engage its leading edge with the stops 54, said sheet is arrested and held by said stops in proper transferring position on the conveyor 14. Thereupon the slide brackets 81 and the rack bars 93 are simultaneously advanced or moved towards the left, as viewed in Fig. 4, transversely of the conveyor 14, and since the collars 108 are held by the packing material 110 against movement on the rods 109, the first effect of this sliding movement of the rack bars 93 will be the swinging upwardly of the pusher fingers 103 about the pivots 105 until the sheet engaging portions of said fingers are vertically disposed across the plane of the sheet supporting and conveying reaches of the tapes 16, as shown in broken lines in Fig. 4. When the pusher fingers 103 reach vertical position, they can rock no further, whereupon said fingers are moved in said vertical position transversely of the conveyor 14 by the rack bars 93 upon continued sliding movement of said bars to the left, the pressure of the rack bars on the pusher fingers overcoming the resistance offered by the packing material 110 and thereby causing the collars 108 to slide at the same time upon and along the rods 109. The movement of the rack bars 93 to the left continues until the vertically disposed pusher fingers 103 have engaged the adjacent longitudinal or side edge of the stopped sheet 11 at spaced points and have moved said sheet transversely of the conveyor 14 into position for operative engagement and withdrawal from said conveyor by the in-feed cylinder 10 or other sheet receiving device.

After the sheet 11 has been moved by the pusher fingers 103 transversely of the conveyor 14 to withdrawing position, as above described, said fingers, the rack bars 93, the slide brackets 81 and the collars 108 are immediately retracted and returned to their original positions shown in full lines in Fig. 4, in readiness for the pusher fingers 103 to engage the next sheet 11 and move it sidewise from rest to withdrawing position, as previously described. Since the collars 108 are held by the packing material 110 against movement on the rods 109, the first effect of the sliding return movement of the rack bars 93 towards the right (Fig. 4) will be the swinging downwardly of the pusher fingers 103 about the pivots 105 until the sheet engaging portions of said fingers are horizontally disposed over said rack bars and below the plane of the active upper reaches of the tapes 16, as shown in full lines in Fig 4. Thereupon the pusher fingers 103 are returned wholly below the plane of the active upper reaches of the tapes 16 to their original positions by the rack bars 93 upon continued return movement of said rack bars at which time the collars 108 are also caused to slide on the rods 109 back to their original positions. The slide brackets 81, rack bars 93, pusher fingers 103 and collars 108 then remain in the full line positions shown in Fig. 4 until the next or succeeding sheet 11 is advanced by the tapes 16 into transferring position against the stops 54 at which time the above described operations of said parts are repeated to transfer said sheet laterally of the conveyor 14 to the in-feed cylinder 10 or other device. The immediate displacement of the pusher fingers 103 below the plane of the active upper reaches of the tapes 16, and the return of said fingers wholly below said plane insures that each succeeding sheet 11 will not be obstructed by said fingers as it moves along the conveyor 14 to transferring position, enables the feeding of the sheets closer together on the conveyor 14, and eliminates the necessity of increasing the time interval between successive sheets, particularly when handling large size sheets, all of which lend to obtaining a relatively high output of fed and transferred sheets.

It will be noted that adjustment of the carriages 36 and 37 as aforesaid toward and away from each other along the bars 21, 22 longitudinally of the conveyor 14 to accommodate different lengths of sheets 11 that may be handled, results in corresponding adjustment of all of the parts of the sheet transfer devices 70 and 71 on said carriages and without disconnecting the mechanism for operating the operated parts of said devices. Novel means are provided for adjusting the sheet engaging pusher fingers 103 to various positions transversely of the conveyor 14 to accommodate different widths of sheets 11 that may be handled and to insure accurate simultaneous engagement of said fingers with each sheet. Said pusher-finger adjusting means being capable of effecting coarse and fine settings of the pusher fingers 103 collectively, and being also capable of effecting fine settings of one of the pusher fingers independently of and relatively to the other pusher finger, said coarse settings being made while the machine is inoperative and during the initial make-ready of said machine, and said fine settings being made from a convenient point on the machine and while it is in operation. In the illustrated embodiment, said pusher-finger adjusting means comprise the following instrumentalities, including the gear-shaft 91 and rack bars 93, preferably constructed, mounted and operated as follows.

As shown particularly in Figs. 1 and 4, the rack bar 93 of one of the sheet transfer devices 70 and 71, i. e., the transfer device 70 in the illustrated embodiment, is made in two sections, an outer toothed section which is engaged by the gear-shaft 91 and has the reference character 93 applied thereto, and an inner plain section which carries the pusher finger 103 and is indicated by the reference character 93' for the sake of description, whereas the rack bar 93 of the other sheet transfer device, i. e., the transfer device 71, is of one-piece construction. The inner rack-bar section 93' is provided at its outer end with an axially extending short pin 112 which is slidably engaged in a suitable bore formed in the opposed inner end of the outer rack-bar section 93, said pin serving to hold said sections in axial alignment and providing for axial sliding movement of the inner section 93' relatively to the outer section 93. The inner rack-bar section 93' has suitably secured thereto at the top and adjacent the outer end thereof one end of a rod 113 which extends from said section over the outer rack-bar section 93 in spaced parallel relation therewith, and over the associated slide bracket 81. The outer free end portion of the rod 113 is externally threaded, as indicated at 114, and extends through suitable axially aligned clearance openings formed in a bracket 115 which is suitably secured to the outer rack-bar section 93 adjacent the outer end thereof.

The bracket 115 is suitably grooved or slotted to receive therein a narrow face, small diameter worm gear 116 (Fig. 2) which is threadedly engaged with the threaded portion 114 of the rod 113 and is held by said bracket against axial movement relative to said rod. The worm gear 116 meshes with a small diameter worm 117 which is disposed between furcations of the bracket 115 and is adapted to drivably receive one end of a flexible shaft 118 that is journalled at said end in suitable bearings provided by said furcations. The opposite end of the flexible shaft 118 extends through and is journalled in a suitable bearing provided in a plate 119 and has suitably secured thereto an operating knob 120. The plate 119 is bolted or otherwise suitably secured to the same upper side-frame beam 12 carrying the supporting bracket 58 for the tubular sheet-stop-adjusting shaft 57 so that the operating knobs 68 and 120 for the shafts 57 and 118, respectively, are conveniently accessible from the same side of the machine. The outer casing of the flexible shaft 118 is secured in the usual manner at opposite ends thereof to the bracket 115 and plate 119.

It will thus appear that as the flexible shaft 118 is manually turned in one direction or the other which may be effected at any time during the normal operation of the machine, the worm gear 116 is slowly rotated, thus imparting minute axial movement to the rod 113 which, in turn, imparts like movement to the inner rack-bar section 93' relatively to the outer rack-bar section 93, thereby effecting a fine adjustment of the pusher finger 103 on said inner section transversely of the conveyor 14 to accurate position independently of and with respect to the other pusher finger 103 so that accurate engagement and transfer of each sheet 11 by said fingers is assured. It will also appear that the adjusting means comprising the rod 113, worm gear 116 and bracket 115 serve to effectively connect the inner rack-bar section 93' and the outer rack-bar section 93 together and, hence, said sections will be reciprocated as a single unit or bar during the normal operation of the machine. It will also appear that the flexible shaft 118 does not interfere with or in any way hinder the adjusting of the carriage 36 along the bars 21, 22, or the operation of the sheet transfer devices 70, 71.

Engaged over the reduced end 92 of the gear-shaft 91 is a sleeve 121 (Figs. 4 and 6) formed at the inner end thereof with a small diameter flange 122 which is overlapped by the flange 95 on the rack-bar-hold-down stud 94 carried by the slide bracket 81 of the sheet transfer device 70. The sleeve 121 is suitably secured to the gear-shaft 91 as by a pin 123 one end of which projects beyond the peripheral surface of said sleeve for a purpose to be presently described. The sleeve 121 is thus held against axial displacement in one direction by the stud-flange 95, and in the opposite direction by the slide bracket 81, and said sleeve, in turn, prevents axial movement of the gear-shaft 91 relative to the said bracket and causes said gear-shaft to move with the carriage 36 and the sheet transfer device 70 when said carriage and the carriage 37 are adjusted along the bars 21 and 22, as hereinbefore described.

Mounted on the sleeve 121 is a friction slip clutch comprising a metallic disk 124 (Fig. 6) which is formed integrally with said sleeve, and another metallic disk 125 which is slidably mounted on said sleeve and is keyed thereto by means of the pin 123, said latter disk being provided with a suitable keyway to receive the projecting end of said pin. Loosely mounted on the sleeve 121 and disposed between the disks 124, 125 is a small diameter worm gear 126, and said disks and worm gear are retained in frictional driving contact with each other by a coil compression spring 127 which surrounds the hub portion of a hand-wheel 128 and has one end thereof engaging against said hand-wheel and the opposite end engaging against the disk 125. The hand-wheel 128 is secured to the sleeve 121 by any suitable well-known means such as, for example, "Dutchman" screws or pins 129. The hand-wheel 128 is shown in broken lines in Fig. 4 in order to more clearly illustrate all of the elements of the adjusting means ordinarily hidden by said hand-wheel.

The worm gear 126 meshes with a small diameter worm 130 (Fig. 4) which is disposed between the furcations of a bifurcated bracket 131 that is suitably secured to the slide bracket 81. The worm 130 is adapted to drivably receive one end of a flexible shaft 132 that is journalled at said end in suitable bearings in the bracket 131. The opposite end of the flexible shaft 132 extends through and is journalled in a suitable bearing provided in the plate 119, and has suitably secured thereto an operating knob 133. The casing of the flexible shaft 132 is secured in the usual manner at opposite ends thereof to the bracket 131 and plate 119.

It will thus appear that when it is desired to effect a considerable movement or coarse adjustment of the sheet engaging pusher fingers 103 in unison transversely of the conveyor 14, this can be quickly and conveniently accomplished before the machine is started and during the make-ready of said machine by simply grasping the hand-wheel 128 and turning it and the sleeve 121 in one direction or the other, the friction disks 124, 125 at this time slipping relative to the worm gear 126 which remains stationary. The gear-shaft 91 will thus be directly rotated in a corresponding direction, thereby imparting axial sliding movement to the rack-bars 93 relative to the slide brackets 81 until the sheet engaging pusher fingers 103 on said rack-bars are in a position transversely of the conveyor 14 corresponding approximately to the position desired for transferring a particular size sheet 11. This coarse or preliminary setting of the pusher fingers 103 may be facilitated by providing scale graduations on one side of one of the rack-bars 93 and a co-operating pointer on the associated slide bracket 81.

After the sheet engaging pusher fingers 103 have been collectively adjusted to an approximate position, as above described, the machine is started and while test sheets are being advanced along the conveyor 14 and the sheet transfer devices 70, 71 are in operation, the pusher fingers 103 are given a fine, final setting by simply grasping the knob 133 and turning said knob and the flexible shaft 132 in one direction or the other. As the flexible shaft 132 is turned, the worm wheel 126 is slowly rotated and through the friction disks 124, 125 imparts like movement to the sleeve 121 and gear-shaft 91, resulting in minute axial movements of the rack-bars 93 and location of the pusher fingers 103 in accurate sheet transferring position. In the event it is found that the pusher fingers 103 are not in accurate transverse alignment, this condition may be quickly corrected by simply turning the knob 120, thereby adjusting one of the pusher fingers 103 relative to the other pusher finger as hereinbefore described. As the feeding and transferring of the sheets 11 continues, accurate location of the pusher fingers 103 transversely of the conveyor 14 and accurate engagement of said fingers with each sheet may be maintained by simply turning the knob 133 or the knob 120 as required.

Although only a single embodiment of the present invention has been illustrated in the accompanying drawings and described in the foregoing specification, it is to be expressly understood that said invention is not limited to said embodiment. Various changes may be made therein, particularly in the design and arrangement of the parts illustrated, as well as in the mode of operation, assembly and manner of use, some of which have been mentioned in the foregoing specification, without departing from the spirit and scope of the invention, as will now be clear to those skilled in the art.

What is claimed is:

1. In a sheet handling apparatus, conveyor means for receiving sheets successively and advancing said sheets to a transferring position, sheet transferring means comprising a plurality of reciprocable fingers spaced longitudinally of said conveyor means and adapted to engage each sheet in turn at and along a longitudinal edge thereof and move said sheet transversely of said conveyor means, means for periodically imparting to said fingers reciprocations crosswise of said conveyor means, and means operable while said fingers are in motion for simultaneously adjusting said fingers in opposite directions transversely of said conveyor means.

2. In a sheet handling apparatus, conveyor means for receiving sheets successively and advancing said sheets to a transferring position, sheet transferring means comprising at least two reciprocable fingers spaced longitudinally of said conveyor means and adapted to engage each sheet in turn at and along a longitudinal edge thereof and move said sheet transversely of said conveyor means, means for periodically imparting to said fingers reciprocations crosswise of said conveyor means, and means operable while said fingers are in motion for adjusting one of said fingers relatively to the other of said fingers in opposite directions transversely of said conveyor means.

3. In a sheet handling apparatus, conveyor means for receiving sheets successively and advancing said sheets to a transferring position, sheet transferring means comprising at least two reciprocable fingers spaced longitudinally of said conveyor means and adapted to engage each sheet in turn at and along a longitudinal edge thereof and move said sheet transversely of said conveyor means, means for periodically imparting to said fingers reciprocations crosswise of said conveyor means, means for effecting a coarse adjustment of both said fingers simultaneously in opposite directions transversely of said conveyor means, and means operable while said fingers are in motion for effecting a vernier adjustment of both said fingers simultaneously in opposite directions transversely of said conveyor means.

4. Apparatus as defined in claim 3, comprising other means operable while said fingers are in motion for effecting a vernier adjustment of one of said fingers relatively to the other of said fingers in opposite directions transversely of said conveyor means.

5. In a sheet handling apparatus, a continuously driven endless conveyor for receiving sheets one after another in spaced relation and advancing said sheets along a predetermined path in a horizontal plane, said conveyor having an idle lower reach and an active sheet-supporting-and-conveying upper reach, adjacent rollers extending transversely of said conveyor between said reaches and engaged by said upper reach, said rollers being arranged to divide said upper reach into a rear section and a front section with a space between said sections, stops extending transversely of said conveyor and associated with said front section for arresting the movement of each sheet in turn at a predetermined position on said conveyor with a portion of said sheet overlying said space, reciprocating sheet transferring means operable in said space to engage a longitudinal edge of each stopped sheet and move said sheet transversely of said conveyor, said sheet transferring means being normally disposed outwardly of said path and below the plane of said conveyor-upper-reach, means for periodically operating said sheet transferring means, and means for swinging said sheet transferring means inwardly towards the sheet to a position across and perpendicular to said plane prior to the sheet transferring movement thereof and for swinging said sheet transferring means outwardly away from the transferred sheet into position below said plane prior to the return movement thereof.

6. Apparatus as defined in claim 5, comprising a carriage for supporting said rollers and said sheet transferring means, and means for adjusting said carriage in opposite directions lengthwise of said conveyor to vary the length of said front section and correspondingly vary the position of the sheet transferring means to accommodate sheets of different sizes.

7. In a sheet handling apparatus, a continuously driven endless conveyor for receiving sheets one after another in spaced relation and advancing said sheets along a predetermined path in a horizontal plane, said conveyor having an idle lower reach and an active sheet-supporting-and-conveying upper reach, a rear roller around which said conveyor passes, a front roller around which said conveyor passes, a set of three rollers extending transversely of said conveyor between said upper and lower reaches and engaged by said upper reach, said set of rollers being so arranged to divide said upper reach into a rear section and a front section with a space between said sections, stops extending transversely of said conveyor and spaced forwardly of said front section for arresting the movement of each sheet in turn at a predetermined position on said conveyor with a portion of said sheet overlying said space and another portion of said sheet projecting beyond said front section, sheet transferring means comprising a pair of pivotally mounted reciprocable fingers one operable in said space and the other operable in the space between said stops and said front section to engage a longitudinal edge of each stopped sheet and move said sheet transversely of said conveyor, said fingers being normally disposed outwardly of said path and below and substantially parallel to said conveyor-upper-reach, means for periodically reciprocating said fingers transversely of said conveyor, and means for swinging said fingers inwardly towards the sheet to a position across and perpendicular to the plane of said conveyor-upper-reach prior to the sheet transferring movement thereof and for swinging said fingers outwardly away from the transferred sheet into position below and substantially parallel to said plane prior to the return movement thereof.

8. Apparatus as defined in claim 7, comprising a carriage for supporting said set of rollers and the said one of said fingers, a second carriage for supporting said front roller and the said other of said fingers, single means for adjusting said carriages simultaneously toward or away from each other to vary the length of said front section and correspondingly vary the positions of said fingers to accommodate sheets of different sizes, and means supporting said stops for adjustment toward or away from said conveyor to maintain the relative spacing between said stops and said front section for the sheets of different sizes and to vary the position at which the movement of each sheet is arrested by said stops.

9. In a sheet handling apparatus, a continuously driven endless conveyor for receiving sheets one after another in spaced relation and advancing said sheets along a predetermined path in a horizontal plane, said conveyor having an idle lower reach and an active sheet-supporting-and-conveying upper reach, a rear roller around which said conveyor passes, a front roller around which said conveyor passes, a set of three rollers extending transversely of said conveyor between the planes of said upper and lower reaches and engaged by said upper reach, said set of rollers being so arranged to divide said upper reach into a rear section and a front section with a space between said sections, a carriage for rotatably supporting said front roller, a second carriage for rotatably supporting said set of rollers, stops extending transversely of said conveyor and spaced forwardly of said front section for arresting the movement of each sheet in turn at a predetermined position on said conveyor with a portion of said sheet overlying said space and another portion of said sheet projecting beyond said front section, sheet transferring means mounted on said carriages and comprising reciprocable fingers operable in said space and in the space between said stops and said front section to engage a longitudinal edge of each stopped sheet and move said sheet transversely of said conveyor, single means for adjusting said carriages and said sheet transferring means thereon simultaneously toward and away from each other, means for periodically reciprocating said fingers transversely of said conveyor in all positions of adjustment of said carriages, and means supporting said stops for adjustment toward or away from said conveyor.

10. In a sheet handling apparatus, conveyor means for receiving sheets successively and advancing said sheets to a transferring position between the opposite ends of said conveyor means, and sheet transferring means arranged at said position and laterally beyond the path of movement of the sheet for moving each sheet in turn transversely of said conveyor means to a position for removal of said sheet laterally from said conveyor means, said sheet transferring means comprising a bar mounted for reciprocation transversely of said conveyor means, a finger pivotally mounted intermediate its ends on said bar and adapted to engage a longitudinal edge of the sheet and move said sheet transversely of said conveyor means, a fixed rod extending transversely of said conveyor means in spaced parallel relation with said bar, a member slidably mounted on said rod, friction means carried by said member and engaged with said rod for normally preventing sliding movement of said member relatively to said rod, a link pivotally mounted on said member and pivotally connected to one end of said finger, said member upon the forward stroke of said bar causing said finger to first rock about its end-pivot inwardly towards the sheet and to a vertical position across and perpendicular to the plane of the sheet supporting surface of said conveyor means and then move with said bar accompanied by said member, and upon the rearward stroke of said bar said member causing said finger to first rock about said end-pivot outwardly away from the transferred sheet and to a substantially horizontal position out of said plane and then move with said bar accompanied by said member, and means for periodically reciprocating said bar.

11. In a sheet handling apparatus, conveyor means for receiving sheets successively and advancing said sheets to a transferring position, and sheet transferring means for moving each sheet in turn transversely of said conveyor means to a position for removal of said sheet laterally from said conveyor means, said sheet transferring means comprising a support, a slide bracket carried by said support, a rack-bar slidably carried by said bracket and extending therefrom transversely of said conveyor means, a toothed member rotatably carried by and bodily movable with said bracket and meshing with the teeth of said rack-bar, means for periodically reciprocating said bracket and therewith said toothed member to cause reciprocation of said rack-bar through said toothed member, a sheet engaging element mounted on said rack-bar for reciprocation therewith to engage a longitudinal edge of a sheet in transferring positoin and move said sheet transversely of said conveyor means and then to move out of engagement with said sheet, and means operatively connected with said toothed member for rotating the latter to adjust said rack-bar axially relative to said bracket thereby to vary the lateral position of said sheet engaging element with respect to said conveyor means.

12. Apparatus as defined in claim 11 wherein said toothed-member-rotating means comprises a worm wheel rotatably carried by said toothed member, a friction slip-clutch carried by and drivably connected with said toothed member for drivably connecting said worm wheel with said toothed member and providing for rotation of said toothed member independently of said worm wheel, a worm meshing with said worm wheel and rotatably carried by said slide bracket, and a flexible shaft drivingly connected with said worm to rotate the latter and thereby effect rotation of said worm wheel and in turn rotation of said toothed member through said clutch.

13. Apparatus as defined in claim 11 wherein said rack-bar is divided into an outer section engaged with said toothed member and an inner section carrying said sheet engaging element and supported by said outer section for sliding movement axially relative thereto, and comprising an externally threaded rod secured at one end thereof to said inner section, a bracket secured to said outer section, a worm wheel threadedly engaged with said rod and held by said bracket against axial movement relative to said rod, a worm meshing with said worm wheel and rotatably carried by said bracket, and a flexible shaft drivably connected with said worm to rotate the latter and thereby effect rotation of said worm wheel and in turn axial movement of said rod and said inner section relative to said outer section, said rod, worm wheel and bracket serving to connect said inner and outer sections and thereby provide for reciprocation of said sections as a single unit, as well as adjustment thereof as a single unit by said toothed member.

References Cited in the file of this patent
UNITED STATES PATENTS

| | | |
|---|---|---|
| 748,125 | Weber | Dec. 29, 1903 |
| 978,551 | Bray | Dec. 13, 1910 |
| 1,029,159 | Westerbeck | June 11, 1912 |
| 1,179,573 | Staude | Apr. 18, 1916 |
| 1,807,843 | Hendrickson | June 2, 1931 |
| 2,409,631 | Jones | Oct. 22, 1946 |
| 2,629,590 | Smith | Feb. 24, 1953 |